United States Patent
Napier

(10) Patent No.: US 9,987,964 B1
(45) Date of Patent: Jun. 5, 2018

(54) BOAT TRAILER HAVING AN INFLATABLE BLADDER

(71) Applicant: Richard Napier, Chickamauga, GA (US)

(72) Inventor: Richard Napier, Chickamauga, GA (US)

(*) Notice: Subject to any disclaimer, the term of this patent is extended or adjusted under 35 U.S.C. 154(b) by 0 days. days.

(21) Appl. No.: 15/728,626

(22) Filed: Oct. 10, 2017

(51) Int. Cl.
*B60P 3/10* (2006.01)
*B62D 63/08* (2006.01)
*B60S 9/04* (2006.01)
*B60Q 1/00* (2006.01)
*B62D 63/06* (2006.01)

(52) U.S. Cl.
CPC ............ *B60P 3/1033* (2013.01); *B62D 63/08* (2013.01); *B60Q 1/0088* (2013.01); *B60S 9/04* (2013.01); *B62D 63/062* (2013.01)

(58) Field of Classification Search
CPC .......... B60P 3/10; B60P 3/1033; B60P 1/1075
USPC ........... 114/54, 344; 280/414.1, 414.2, 414.3
See application file for complete search history.

(56) References Cited

U.S. PATENT DOCUMENTS

| | | | |
|---|---|---|---|
| 3,004,771 A | 10/1961 | Moore, Jr. | |
| 3,626,447 A * | 12/1971 | Hindlin | B63C 1/06 405/221 |
| 3,744,072 A | 7/1973 | Peterson | |
| 4,092,755 A * | 6/1978 | Hughes | B60P 3/1033 114/344 |
| 4,286,346 A * | 9/1981 | Wiek | B60P 3/1058 114/344 |
| 4,697,762 A | 10/1987 | Amey | |
| D292,785 S | 11/1987 | Warren | |
| 5,176,394 A * | 1/1993 | Veazey | B60P 3/1033 114/344 |
| D377,156 S | 1/1997 | Muir | |
| 6,802,274 B2 | 10/2004 | Mears | |
| 6,851,382 B2 | 2/2005 | Carter | |
| 7,216,603 B2 * | 5/2007 | Towley, III | B63B 35/44 114/263 |
| 8,091,912 B2 | 1/2012 | Hyslop | |
| 2002/0078876 A1 * | 6/2002 | Ockels | B60P 3/1058 114/344 |
| 2009/0084303 A1 * | 4/2009 | Kazmierowicz | B63B 3/08 114/344 |
| 2011/0243663 A1 * | 10/2011 | Smith | B63C 1/02 405/3 |

FOREIGN PATENT DOCUMENTS

CA 1239136 A 7/1988

* cited by examiner

Primary Examiner — Anne Marie M Boehler

(57) ABSTRACT

The boat trailer having an inflatable bladder is a boat trailer with an inflatable bladder located under the rear end of the trailer. The bladder is coupled to an air hose that runs to a hose connecter at the front of the trailer. The bladder is retained in place by a combination of longitudinal and lateral support rails, which are part of the trailer frame and by a bladder barrier that covers the bladder and prevents it from rising above the top of the trailer. If the trailer is backed down the boat ramp and the wheels leave the boat ramp at an end-of-ramp drop-off, a source of compressed air may be used to inflate the bladder. This provides buoyancy to elevate the trailer wheels so that the tow vehicle may pull the trailer up the boat ramp.

14 Claims, 4 Drawing Sheets

BOAT TRAILER HAVING AN INFLATABLE BLADDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of recreational boating, more specifically, a boat trailer having an inflatable bladder.

Marina facilities where small boats are launched may provide boat ramps that are shorter than expected and end with an abrupt drop-off to deeper water. Because the end of the boat ramp is under water it may not be visible and the boater may not be aware of the length and drop-off. Upon occasion a boater may back their boat trailer down such a boat ramp to the point where the trailer wheel go past the end of the boat ramp. Removing the boat trailer from such a situation is problematic and may result in damage to the boat trailer.

SUMMARY OF INVENTION

The boat trailer having an inflatable bladder is a boat trailer with an inflatable bladder located under the rear end of the trailer. The bladder is coupled to an air hose that runs to a hose connecter at the front of the trailer. The bladder is retained in place by a combination of longitudinal and lateral support rails which are part of the trailer frame and by a bladder barrier that covers the bladder and prevents it from rising above the top of the trailer. If the trailer is backed down the boat ramp and the wheels leave the boat ramp at an end-of-ramp drop-off, a source of compressed air may be used to inflate the bladder. This provides buoyancy to elevate the trailer wheels so that the tow vehicle may pull the trailer up the boat ramp.

An object of the invention is to provide a boat trailer that may move a boat over road surfaces to and from a boat ramp.

Another object of the invention is to provide an inflatable bladder under the rear of the boat trailer to lift the rear of trailer in the water if the trailer is backed past an end-of-ramp drop-off A further object of the invention is to provide an air line from the bladder to a hose connector in the vicinity of the trailer tongue.

Yet another object of the invention is to provide a bladder that contracts to its original size when deflated.

These together with additional objects, features and advantages of the boat trailer having an inflatable bladder will be readily apparent to those of ordinary skill in the art upon reading the following detailed description of the presently preferred, but nonetheless illustrative, embodiments when taken in conjunction with the accompanying drawings.

In this respect, before explaining the current embodiments of the boat trailer having an inflatable bladder in detail, it is to be understood that the boat trailer having an inflatable bladder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the boat trailer having an inflatable bladder.

It is therefore important that the claims be regarded as including such equivalent construction insofar as they do not depart from the spirit and scope of the boat trailer having an inflatable bladder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
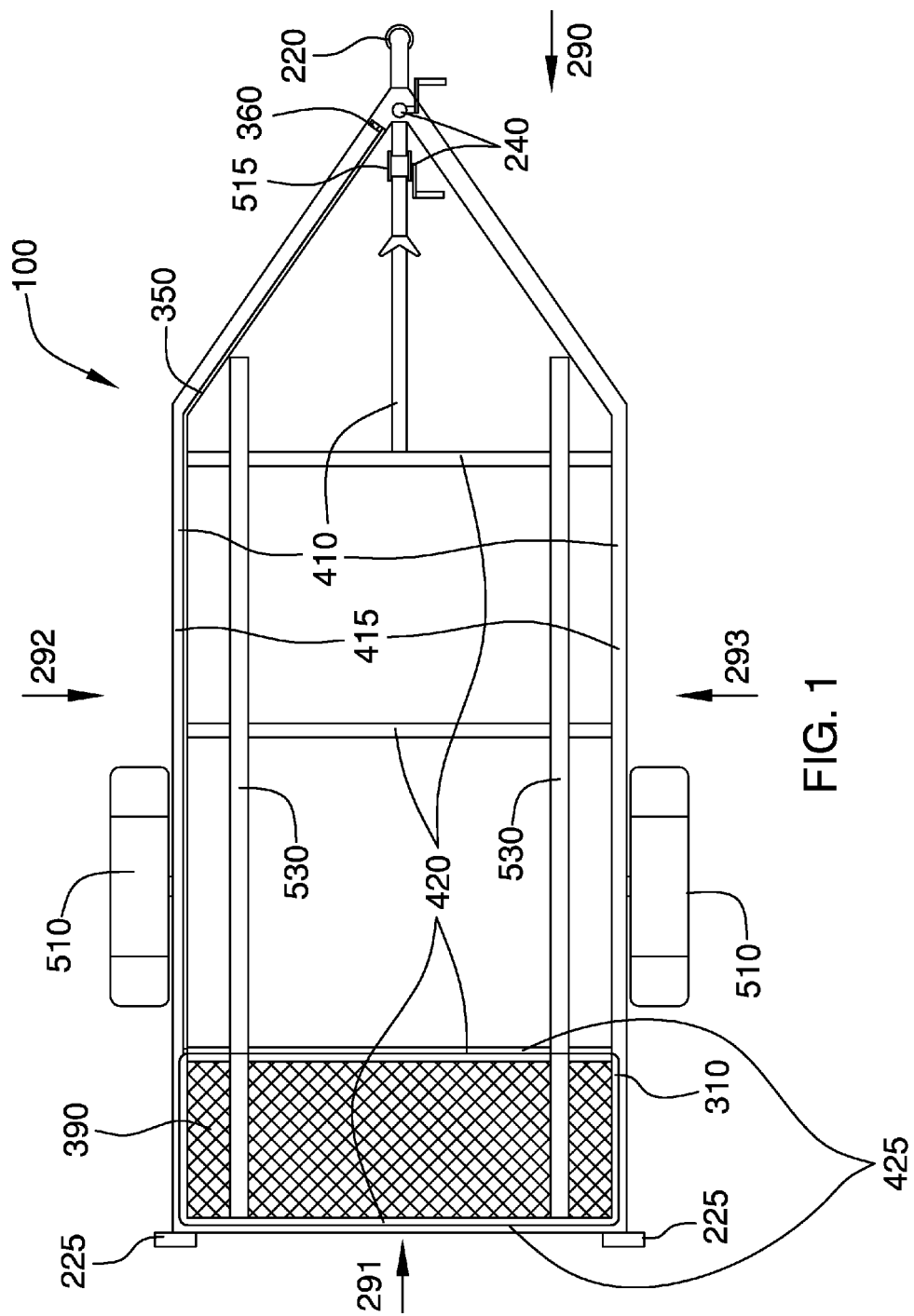
FIG. 1 is a top view of an embodiment of the disclosure.
Figure 2:
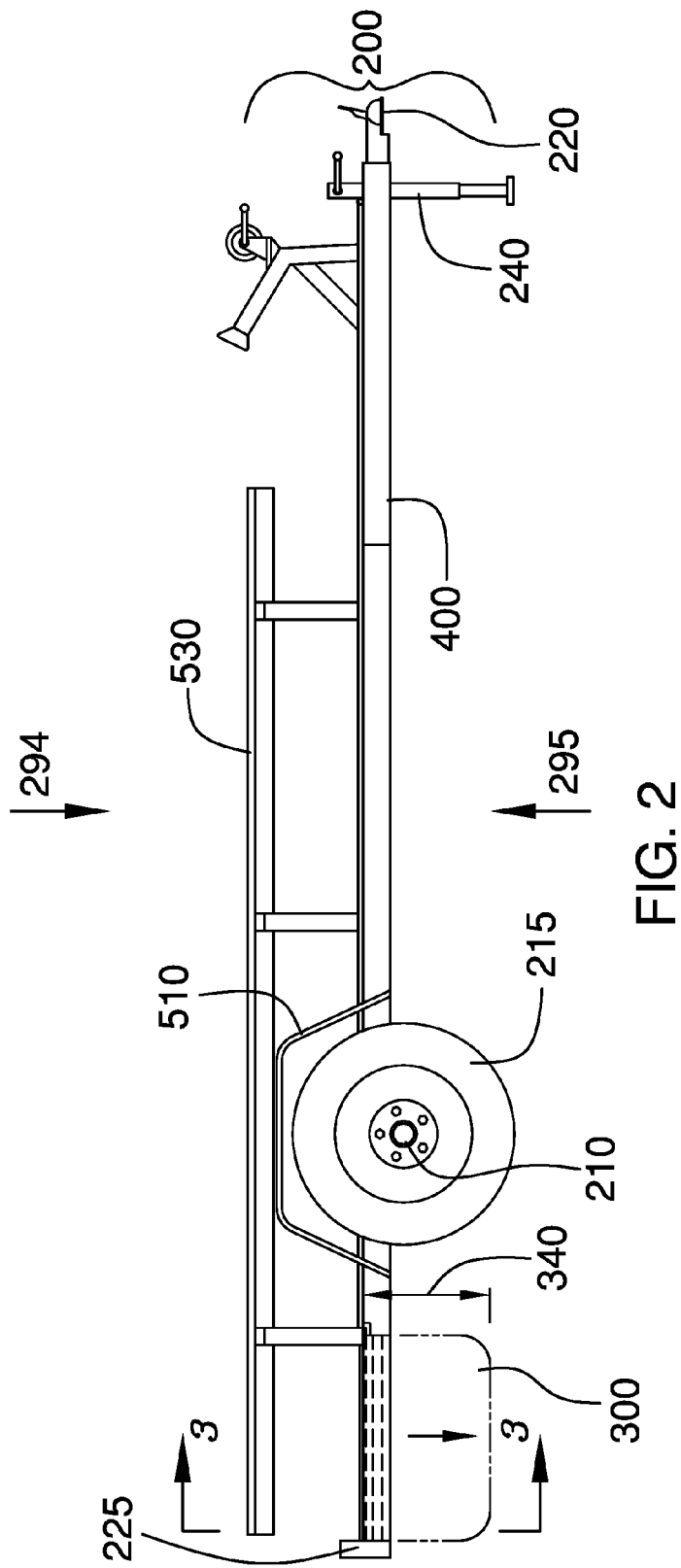
FIG. 2 is a side view of an embodiment of the disclosure.
Figure 3:
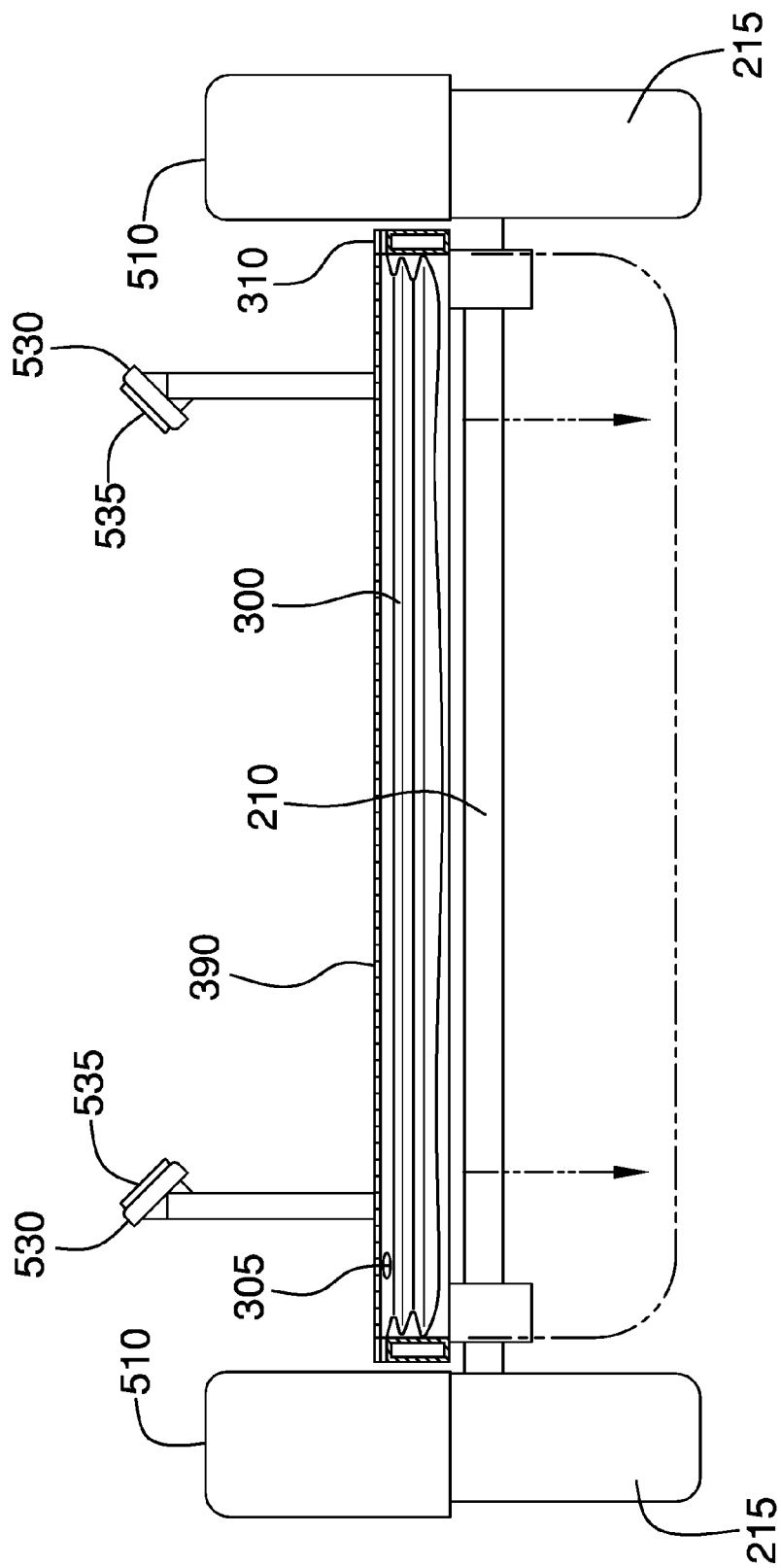
FIG. 3 is a cross-sectional view of an embodiment of the disclosure across 3-3 as shown in FIG. 2.
Figure 4:
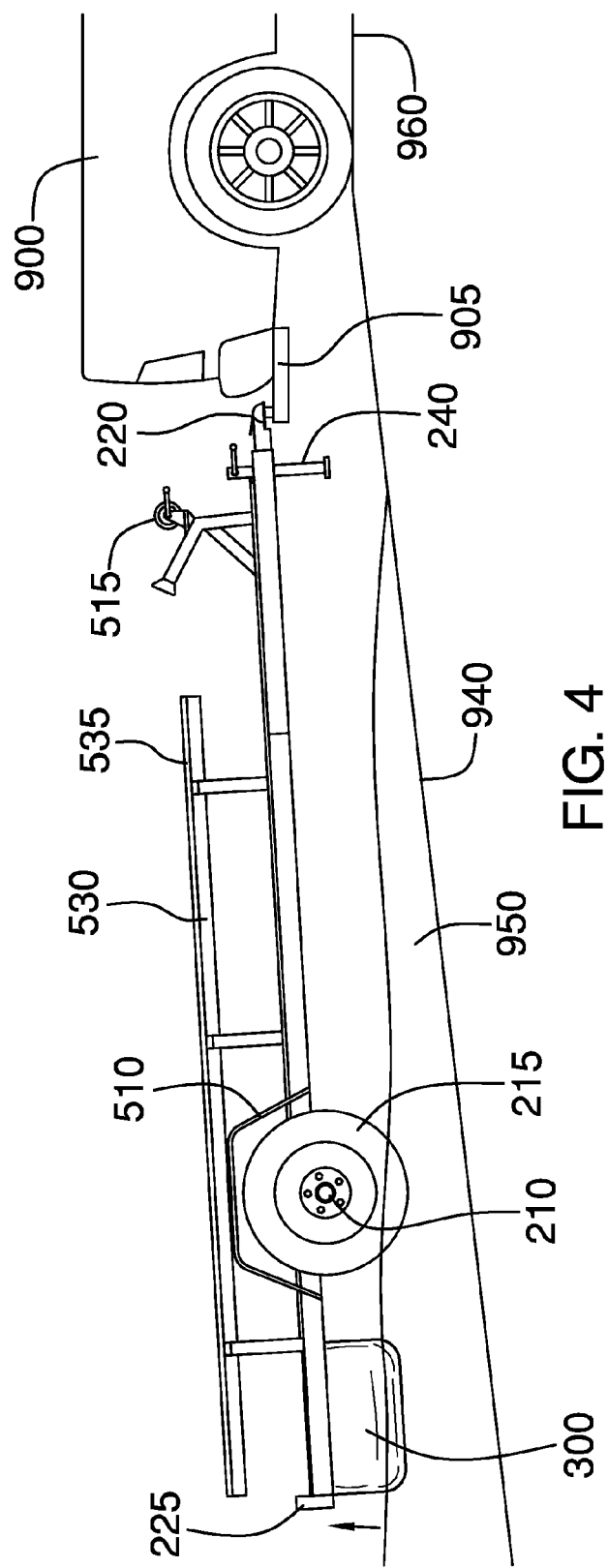
FIG. 4 is a side view of an embodiment of the disclosure during use.

Detailed reference will now be made to a first potential embodiment of the disclosure, which is illustrated in FIGS. 1 through 4.

The boat trailer having an inflatable bladder 100 (hereinafter invention) comprises a trailer body 200, a bladder 300, an air hose 350, a hose fitting 360, and a bladder barrier 390. The invention 100 is capable of trailering a boat (not illustrated in the figures) into and out of a body of water 950. The bladder 300 at the rear of the trailer body 200 may be inflated to make the trailer body 200 buoyant when the trailer body 200 is in the water 950.

The trailer body 200 may be a wheeled conveyance which attaches to a trailer hitch 905 of a tow vehicle 900 and which transports the boat over roads. The trailer body 200 may vary in size, shape, and specific features based upon the boat that it is intended to accommodate and based upon the cost point of the trailer body 200.

The bladder 300 may be an inflatable container located on the underside of the trailer body 200 between a rear 291 of the trailer body 200 and one or more sets of wheels 215. The bladder 300 may have flexible sides and may form a sealed bag into which air may be pumped. The bladder 300 may be inflated by forcing the air in through the air hose 350 and may deflated by allowing the air to escape from the bladder 300.

When deflated, the bladder 300 is contained within a space bounded on a left 292 side and a right 293 side by an outermost pair of rails 415 selected from a plurality of longitudinal support rails 410, on a front 290 side and the rear 291 side by a pair of adjacent rails 425 selected from a plurality of lateral support rails 420, and on a top 294 side by the bladder barrier 390. A bottom 295 side of the bladder 300 is unconstrained.

When inflated the bladder 300 expands downward. A height of the inflated bladder 340 may be less than or equal to the distance from the ground 960 to the top of a frame 400 of the trailer body 200. If the trailer body 200 is in the water 950 when the bladder 300 is inflated, the bladder 300 may make the trailer body 200 buoyant and may cause the trailer body 200 to float. This may allow the tow vehicle 900 to pull the trailer body 200 forward and back onto a boat ramp 940 in the event that the one or more sets of wheels 215 had been pushed past a drop-off when backing the trailer body 200 into the water 950.

When deflated again, the bladder 300 contracts back to approximately its original size. The bladder 300 may have contraction assistance. As a non-limiting example, the bladder 300 may be constructed of materials that have been folded, pieced, or molded to have an accordion fold or other pleated shape that tends to cause the bladder 300 to contract when the air is removed from the bladder 300. The choice of elastomeric materials may further assist with contraction. In some embodiments, external devices may act to compress the bladder 300. As non-limiting examples, the external devices may comprise elastic straps, bungee cords, ropes, nylon straps, netting, springs, and other devices capable of applying force to the bladder 300 to squeeze the air out of the bladder 300.

The bladder 300 may be retained in place by a coupling between the bladder 300 and the trailer body 200 that may be located along the plurality of longitudinal support rails 410 and along the plurality of lateral support rails 420. As non-limiting examples, the coupling between the bladder 300 and the trailer body 200 may be rope or wire that is laced through grommet holes on the bladder 300 and through anchors on the trailer body 200, hook and loop fasteners, or another mechanical coupling. In some embodiments, the bladder 300 may further be retained in place by coupling between the top 294 surface of the bladder 300 and the bladder barrier 390.

The bladder 300 may be fabricated from a material that is flexible and air tight. As non-limiting examples, the bladder 300 may be composed a natural or synthetic elastomers. The bladder may be reinforced by other materials such as metal wires or natural or synthetic fibers that have been incorporated into the material or are added externally. Reinforcing materials may also aid in contraction of the bladder 300 when the bladder 300 is deflated.

The bladder barrier 390 may prevent the bladder 300 from rising above the frame 400 when the bladder 300 is inflated. The bladder barrier 390 may present a permeable surface above the bladder 300 so that the water 950 may pass through the bladder barrier 390 as the trailer body 200 is backed down the boat ramp 940 and the trailer body 200 submerges. The bladder barrier 390 may comprise a net or grille that is coupled to the frame 400 at the plurality of longitudinal support rails 410 and the plurality of lateral support rails 420. In some embodiments, the bladder barrier 390 may be secured to a mounting flange 310 which is coupled to the frame 400 and which runs around the plurality of longitudinal support rails 410 and the plurality of lateral support rails 420 surrounding the bladder 300.

The air hose 350 may run from the bladder 300 to the vicinity of a tongue 220 on the trailer body 200. The air hose 350 may be coupled to the bladder 300 such that the air may pass freely from the air hose 350 into the bladder 300 or from the bladder 300 into the air hose 350. The air hose 350 may be rigid or semi-rigid so that the presence of compressed air in the air hose 350 does not cause the air hose 350 to expand. The air hose 350 may be supported along the way by mechanical couplings to the frame 400. The air hose 350 may terminated by the hose fitting 360 in the vicinity of the tongue 220. When it is necessary to inflate the bladder 300, a source of compressed air (not illustrated in the figures) may be attached to the hose fitting 360 and may be allowed to force the air into the air hose 350 via the hose fitting 360. As non-limiting examples, the source of compressed air may be a compressed air line, air tank, or compressor located on the tow vehicle 900. In some embodiments, the air tank or air compressor may be mounted on the front 290 of the trailer body 200. To deflate the bladder 300, the hose fitting 360 or a bladder valve 305 may be opened to allow the air to escape from the bladder 300.

The trailer body 200 comprises the frame 400, one or more axles 210, the one or more sets of wheels 215, the tongue 220, electrical wiring (not illustrated in the figures), lights 225, and electrical connection (not illustrated in the figures), and a trailer jack 240. The frame 400 comprises the plurality of longitudinal support rails 410 and the plurality of lateral support rails 420. The plurality of longitudinal support rails 410 may be oriented parallel to each other and perpendicular to the plurality of lateral support rails 420. Where the plurality of longitudinal support rails 410 intersect the plurality of lateral support rails 420 they may be coupled to each other. As non-limiting examples, the plurality of longitudinal support rails 410 may be welded or bolted to the plurality of lateral support rails 420 at each point of intersection.

At the front 290 of the frame 400, the plurality of longitudinal support rails 410 may converge towards the center of the frame 400 to form a single point of connection to the tow vehicle 900. Convergences of the plurality of longitudinal support rails 410 also provides clearance between the trailer body 200 and the tow vehicle 900 during turns. The tongue 220 may be coupled to the front 290 of the trailer body 200 at the location where the plurality of longitudinal support rails 410 converge.

The one or more axles 210 may couple, either directly or indirectly, to the trailer body 200 at locations that are between the center of the frame 400 and the rear 291 of the frame 400. The one or more axles 210 may be oriented perpendicularly to the direction of travel so that the one or more sets of wheels 215 are free to turn as the trailer body 200 is pulled over the ground 960. At the ends of each of the one or more axles 210, the one or more axles 210 rotationally couple to the one or more sets of wheels 215. The one or more sets of wheels 215 may comprise rubber tires on metal rims.

The tongue 220 may be a mechanical coupling that allows the trailer body 200 to mate with the trailer hitch 905 that is located on the rear 291 of the tow vehicle 900.

The electrical wiring may be one or more electrical conductors that run from the electrical connection located in the vicinity of the tongue 220 to the lights 225 located at the rear 291 of the trailer body 200. The electrical connection couples to a complementary connector attached to the tow vehicle 900 and allows the tow vehicle 900 to activate the lights 225. As a non-limiting example, the tow vehicle 900 may need to cause activation of the lights 225 to signal turns or to warn of braking. The electrical wiring may be supported by mechanical couplings to the frame 400 of the trailer body 200 along the path from the electrical connection to the lights 225.

The trailer jack 240 may provide a manually operated extensible support that allows the trailer body 200 to remain level during periods when the invention 100 is not coupled to the tow vehicle 900.

The trailer body 200 may further comprises any or all of fenders covering each wheel 510, a winch 515, bunks 530, bunk covers 535, a spare tire carrier (not illustrated in the figures), a spare tire (not illustrated in the figures), and braking system (not illustrated in the figures). The fenders covering each wheel 510 may prevent water or mud from the one or more sets of wheels 215 from being flung onto the boat. The winch 515 may allow the boat to be pulled onto the trailer body 200. The bunks 530 may be an area of the trailer body 200 that are intended to support the boat and to provide a surface upon which the boat may slide onto and off of the trailer body 200 without being scratched. The bunks 530 may be elongated strips of material that are coupled to the top 294 side of the frame 400. The bunks 530 may be composed of a rubber-like or plastic material. The bunks 530 may be covered by the bunk covers 535 to assist in reducing friction and to reduce the likelihood of scratching. As a non-limiting example, the bunk covers 535 may be carpeting. The spare tire may be an additional wheel that is carried as a reserve and which may replace one wheel of the one or more sets of wheels 215 in the event of a flat tire. The spare tire carrier may be an area of the trailer body 200 designated for carrying the spare tire and equipped to do so.

In some embodiments, the braking system may be provided to apply internal friction to the one or more sets of wheels 215 during braking of the tow vehicle 900. As non-limiting examples, the braking system on the invention 100 may be electrically or hydraulically activated through couplings with the tow vehicle 900.

In use, the invention 100 is connected to the tow vehicle 900 just like any other boat trailer and then driven to the boat ramp 940 where it may be backed into the water 950 to launch the boat. If the trailer body 200 is backed too far and the one or more sets of wheels 215 go past a drop-off at the end of the boat ramp 940, the boat may be moved out of the way and the source of compressed air may connected to the hose fitting 360. The air may be forced into the bladder 300 creating buoyancy at the rear end of the trailer body 200. This buoyancy may lift the trailer body 200, elevating the one or more sets of wheels 215 high enough that they will clear the drop-off at the end of the boat ramp 940. The tow vehicle 900 may be used to pull the trailer body 200 forward, even to the extent of removing the trailer body 200 from the boat ramp 940 area. The bladder 300 may then be deflated by disconnecting and opening the hose fitting 360 or by opening the bladder valve 305.

As used in this disclosure, an "accordion fold" is a pleated structure that resembles the bellows of an accordion. As used in this disclosure, a "cable" is a collection of insulated wires covered by a protective casing that is used for transmitting electricity or telecommunication signals. In this disclosure, "compressed air" means air that has been compressed to a pressure greater than atmospheric pressure. As used herein, the term "cost point" refers to the targeted cost of an item of an item. As a non-limiting example, the cost point may refer to a desired cost that includes bill of materials costs, assembly and other labor costs, packaging costs, shipping costs, or any combination thereof. As used herein, the words "couple", "couples", "coupled" or "coupling", mean connected, either directly or indirectly and does not necessarily imply a mechanical connection.

As used in this disclosure, "elastic" refers to a material or object that deforms when a force is applied to it and that is able to return to its relaxed shape after the force is removed. A material that exhibits these qualities is also referred to as an elastomeric material. As used in this disclosure, "flexible" refers to an object or material that will deform when a force is applied to it but that will not necessarily return to its original shape when the deforming force is removed. As used herein, the word "grille" is intended to mean a first plurality of parallel metal bars, rods, or wires that are coupled to and held in place by a second plurality of parallel metal bars, rods, or wires or to a planar surface that has been made permeable to air or water by removing material, usually in a predetermined pattern of cutouts. As used in this disclosure, a "grommet" is an eyelet placed in a hole in a textile, sheet, or panel to protect a rope, hook, or cable passed through it and to protect the textile, sheet, or panel from being torn. As used in this disclosure, a "hook and loop fastener" is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. As used herein, the word "hose" is intended to include hoses, tubing, piping, and other conduits capable of directing an airflow or a waterflow.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors. As used herein, "in the vicinity of the tongue" refers to placement of the ends of cables and hoses which terminate at the front end of the trailer and which provide an excess length so that the cable or hose may be connected to a complementary couplings located on the tow vehicle. In some cases, the complementary coupling on the tow vehicle may also be at the end of cables or hoses that reach towards the front of the trailer from the tow vehicle. Because the hoses and cables are flexible they do not reside at a fixed location and instead may hang at the front of the trailer where they are accessible for connection.

With respect to the above description, it is to be realized that the optimum dimensional relationship for the various components of the invention described above and in FIGS.

1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A boat trailer having an inflatable bladder comprising:
   a trailer body, a bladder, an air hose, a hose fitting, and a bladder barrier;
   wherein the boat trailer having an inflatable bladder trailers a boat into and out of a body of water;
   where the bladder is located at a rear of the trailer body;
   wherein the bladder is inflated to make the trailer body buoyant when the trailer body is in the water;
   wherein the trailer body is a wheeled conveyance which attaches to a trailer hitch of a tow vehicle;
   wherein the trailer body transports the boat over roads;
   wherein the bladder is an inflatable container located on an underside of the trailer body between the rear of the trailer body and one or more sets of wheels;
   wherein the bladder has flexible sides and forms a sealed bag into which air is pumped;
   wherein the bladder is inflated by forcing the air in through the air hose;
   wherein the bladder is deflated by allowing the air to escape from the bladder;
   wherein when deflated, the bladder is contained within a space bounded on a left side and a right side by an outermost pair of rails selected from a plurality of longitudinal support rails, on a front side and the rear of the trailer body by a pair of adjacent rails selected from a plurality of lateral support rails, and on a top side by the bladder barrier;
   wherein a bottom side of the bladder is unconstrained;
   wherein when inflated the bladder expands downward;
   wherein a height of the inflated bladder is less than or equal to the distance from the ground to the top of a frame of the trailer body;
   wherein if the trailer body is in the water when the bladder is inflated, the bladder makes the trailer body buoyant and causes the trailer body to float;
   wherein when deflated, the bladder contracts back to its original size;
   wherein the bladder comprises contraction assistance.

2. The boat trailer having an inflatable bladder according to claim 1
   wherein the bladder is retained in place by a coupling between the bladder and the trailer body that is located along the plurality of longitudinal support rails and along the plurality of lateral support rails.

3. The boat trailer having an inflatable bladder according to claim 2
   wherein the bladder is retained in place by the coupling between the top surface of the bladder and the bladder barrier.

4. The boat trailer having an inflatable bladder according to claim 2
   wherein the bladder is fabricated from a material that is flexible and air tight.

5. The boat trailer having an inflatable bladder according to claim 4
   wherein the bladder is reinforced by other materials.

6. The boat trailer having an inflatable bladder according to claim 4
   wherein the bladder barrier prevents the bladder from rising above the frame when the bladder is inflated;
   wherein the bladder barrier presents a permeable surface above the bladder so that the water passes through the bladder barrier as the trailer body is backed down a boat ramp and the trailer body submerges;
   wherein the bladder barrier comprises a net or grille that is coupled to the frame at the plurality of longitudinal support rails and the plurality of lateral support rails.

7. The boat trailer having an inflatable bladder according to claim 6
   wherein the bladder barrier is secured to a mounting flange which is coupled to the frame and which runs around the plurality of longitudinal support rails and the plurality of lateral support rails surrounding the bladder.

8. The boat trailer having an inflatable bladder according to claim 6
   wherein the air hose runs from the bladder to a tongue on the trailer body;
   wherein the air hose is coupled to the bladder such that the air passes freely from the air hose into the bladder or from the bladder into the air hose;
   wherein the air hose is supported along the way by mechanical couplings to the frame;
   wherein the air hose is terminated by the hose fitting;
   wherein when it is necessary to inflate the bladder, a source of compressed air is attached to the hose fitting and is allowed to force the air into the air hose via the hose fitting.

9. The boat trailer having an inflatable bladder according to claim 8
   wherein to deflate the bladder, the hose fitting or a bladder valve is opened to allow the air to escape from the bladder.

10. The boat trailer having an inflatable bladder according to claim 9
    wherein the trailer body comprises the frame, one or more axles, the one or more sets of wheels, the tongue, electrical wiring, lights, an electrical connection and a trailer jack;
    wherein the frame comprises the plurality of longitudinal support rails and the plurality of lateral support rails;
    wherein the plurality of longitudinal support rails are oriented parallel to each other and perpendicular to the plurality of lateral support rails;
    wherein the plurality of longitudinal support rails are coupled to the plurality of lateral support rails where they intersect.

11. The boat trailer having an inflatable bladder according to claim 10
    wherein the plurality of longitudinal support rails converge towards the center at the front of the frame to form a single point of connection to the tow vehicle.

12. The boat trailer having an inflatable bladder according to claim 11
    wherein the one or more axles couple to the trailer body at locations that are between a center of the frame and the rear of the frame;

wherein the one or more axles are oriented perpendicularly to the direction of travel;
wherein the one or more axles rotationally couple to the one or more sets of wheels at the ends of each of the one or more axles.

13. The boat trailer having an inflatable bladder according to claim 12
wherein the tongue is a mechanical coupling that allows the trailer body to mate with the trailer hitch that is located on a rear of the tow vehicle.

14. The boat trailer having an inflatable bladder according to claim 13
wherein the trailer jack provides a manually operated extensible support that allows the trailer body to remain level during periods when the boat trailer having an inflatable bladder is not coupled to the tow vehicle.

* * * * *